United States Patent [19]

Thompson

[11] 3,994,422
[45] Nov. 30, 1976

[54] HAND-HELD SEED DISPENSER

[76] Inventor: Raymond C. Thompson, 5517 Blaisdell Ave., Minneapolis, Minn. 55419

[22] Filed: Mar. 11, 1976

[21] Appl. No.: 665,764

[52] U.S. Cl. .............................. 222/266; 222/267; 222/305; 222/471
[51] Int. Cl.² .......................................... G01F 11/00
[58] Field of Search ........... 222/368, 266, 267, 268, 222/177, 288, 305, 287, 471; 221/266

[56] References Cited
UNITED STATES PATENTS 2,201,556  5/1940  Croce .................................. 222/267
2,906,437  9/1959  Wallis .................................. 222/177

Primary Examiner—Stanley H. Tollberg
Attorney, Agent, or Firm—Schroeder Siegfried Ryan & Vidas

[57] ABSTRACT

A manually operated hand-held seed dispenser for dispensing multiple seed charges in a spaced linear relationship. The seeder is adjustable to dispense seeds of varying size and seed charges of varied predetermined quantity.

5 Claims, 7 Drawing Figures

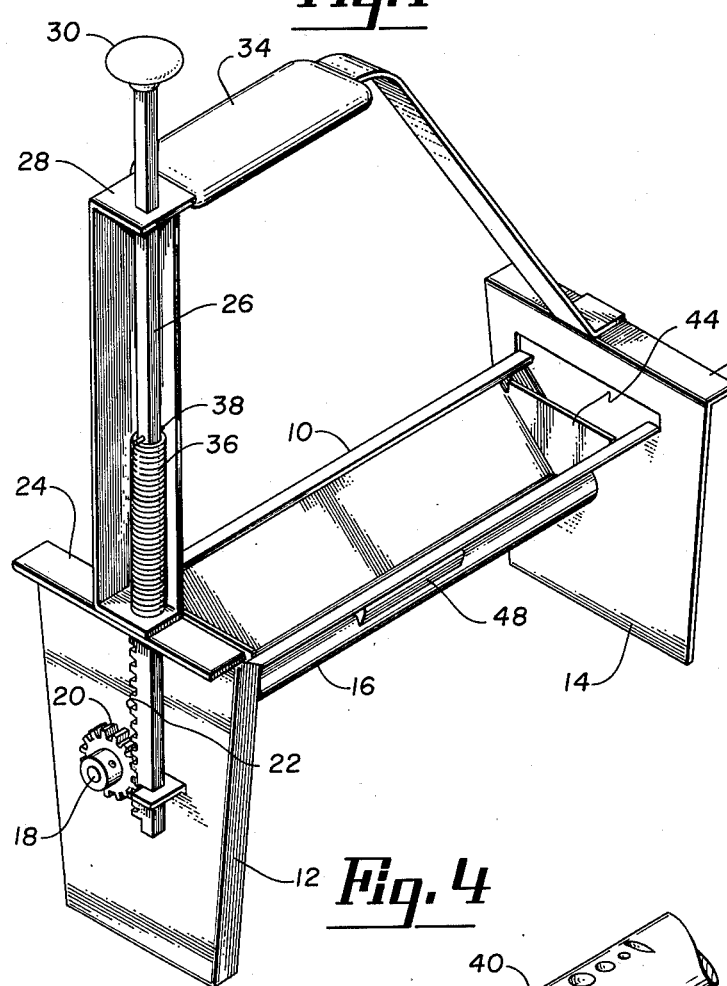
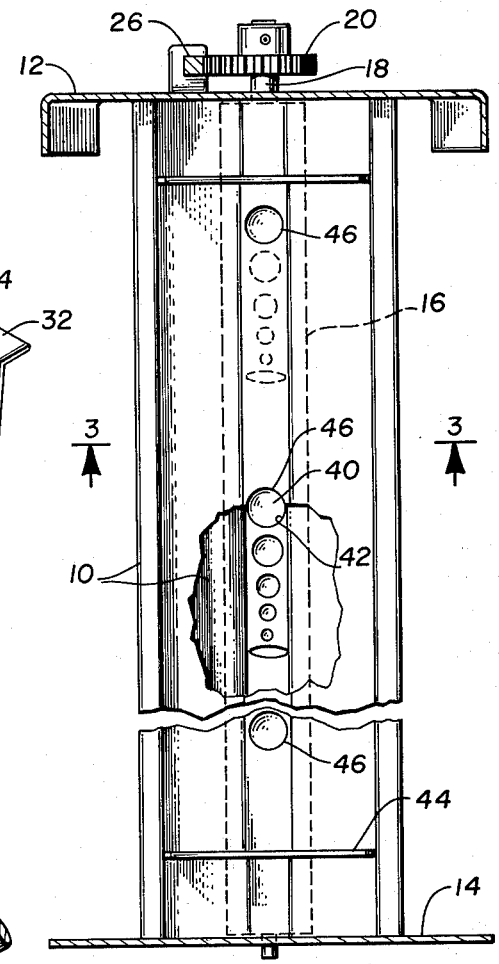
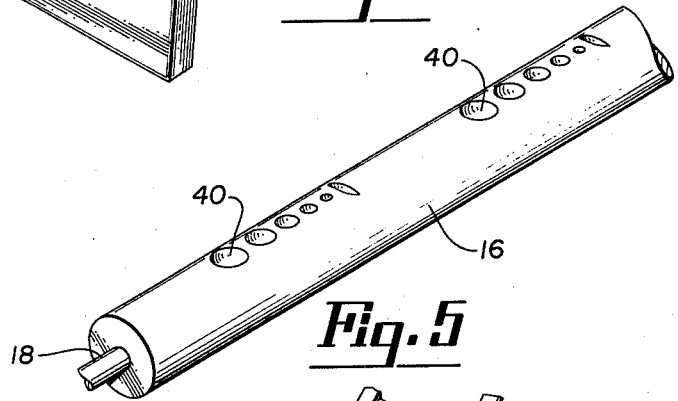
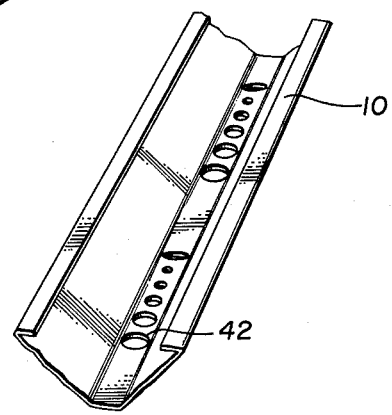

HAND-HELD SEED DISPENSER

This invention relates to seed planter apparatus and more particularly, involves an apparatus which is used for dispensing and precisely depositing charges of seed on a prepared seedbed in a predetermined spaced relationship. The seeder is particularly suited to use by a home gardener in planting varied types of seeds in a small garden plot. It is one object of this invention to provide a novel hand-held garden seed dispenser for dispensing multiple seed charges separated by a uniform distance.

Another object is to provide a dispenser readily adaptable for dispensing varying types of seeds and seeds of differing sizes with a minimum of adjustments being made to the machine to accomodate seeds of various sizes.

A more specific object is to provide a seed planter device for seeds of varying sizes comprising a seed hopper having a seed dispensing area containing multiple sets of collinear seed dispensing apertures of varying size; selector means for selectively exposing only selected seed dispensing apertures in each set of apertures; a rotary delivery member mounted below the seed dispensing area of said hopper with seed receiving chambers of varying size in communication with the apertures in the seed dispensing area of said seed hopper; and actuator means for moving said rotary delivering member from a first position wherein multiple charges of seeds are received to a second position wherein the seeds are dispensed from the chambers of said delivery member into said seedbed.

It is another object of this invention to provide a seed dispensing device as described by the preceding objects and also having a novel actuator means for rotating the rotary delivery member and agitating the supply of seeds in the seed hopper to deliver a repeatable predetermined quantity of seeds through said apertures into the seed receiving chambers of said rotary delivery member.

These and other objects and advantages of my invention will more fully appear from the following description, made in connection with the accompanying drawings, wherein like-reference characters refer to the same or similar parts throughout the several views and of which:

FIG. 1 is a pictorial view of the seed dispenser;

FIG. 2 is a plan view of the top of the seed dispenser with the carrying handle shown in phantom outline and a portion of the hopper cut away to show the structure of the rotary delivery member;

FIG. 3 is a cross-sectional view of the seed planter shown in FIG. 2 taken along the section line 3—3;

FIG. 4 is a pictorial view showing the detail of the rotary delivery member;

FIG. 5 is a pictorial view showing the detail of the apertures of varying size distributed along the dispensing area of the hopper portion of my seed planter.

Figure 6:
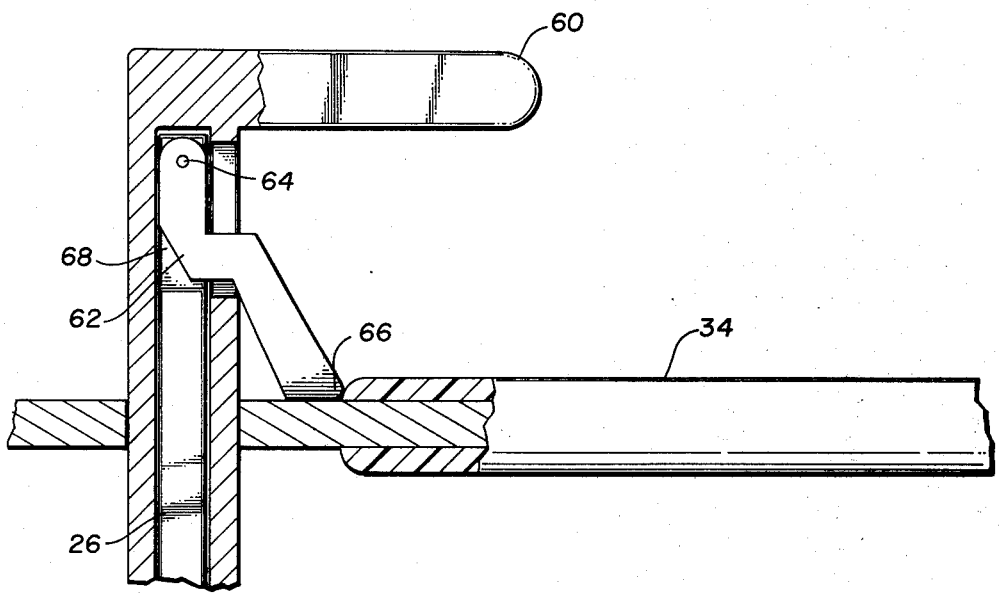
FIGS. 6 and 7 are cross-sectional views of an alternative actuating structure.

Referring particularly to FIG. 1, the overall structure of the seed planter is shown. A hopper 10 is supported by end pieces 12 and 14 which support the bottom or seed dispensing area of the hopper several inches above the ground.

A rotary delivery member 16 is mounted on a shaft 18 which passes through end plates 12 and 14 to permit rotation of rotary member 18 about its axis.

A pinion gear 20 is also attached to shaft 18 in operative relationship with a rack 22 which passes through the projecting upper lip 24 of end plate 12 and is terminated by a rod 26 which passes through an aperture in handle support 28 and is terminated in the embodiment shown with a handle or knob 30. Handle support 28 is connected at its other end to the upper surface 32 of end plate 14. A hand grip 34 may be attached to handle 28 to facilitate the gripping of handle 28 by an operator. A return spring 36 with one end bearing on projection 24 of end plate 12 and the other end bearing on a pin 38 passing through rod 26 is used to return the rack 22 and shaft 26 to the full upright position shown in FIG. 1. When handle 30 is pressed downwardly by an operator, rack 22 drives pinion gear 20 in a clockwise direction rotating rotary delivery member 18 through at least one-half of a complete revolution.

As shown in detail in FIG. 4, the rotary delivery member 16 contains a number of seed dispensing chambers 40 which are drilled or otherwise formed into the body of the rotary delivery member or shaft 16. The chambers are of progressively varying size and arranged in multiple sets with all chambers of similar size being separated by the same distance.

The bottom surface of seed hopper 10 contains a plurality of apertures 42 as shown in the detailed view of the hopper in FIG. 5. The size and arrangement of the apertures in hopper 10 correspond to the size and arrangement of seed receiving chambers 40 in rotary delivery member 16.

A variety of sizes of apertures 42 and cooperative seed-receiving chambers 40 is provided so that the seed dispensing apparatus can be utilized with a variety of different types of seeds of differing size. When a particular type and size of seed is to be planted, a particular aperture and seed chamber combination is selected and all other apertures are blocked while only the selected apertures are used for planting. This is accomplished by means of opening selector or slide 44 which, as shown in FIGS. 2 and 3, is slidably inserted in hopper 10. Selector 44 contains a number of large apertures 46 which correspond in size to the largest of the apertures 42 which interrupt the bottom surface of hopper 10. The apertures 46 are spaced by a distance equal to the spacing between apertures 42 and seed chambers 40 of similar size. When selector 44 is moved in hopper 10 until one of its large apertures 46 coincides with an aperture 42 in hopper 10 of the desired size, the remainder of apertures 42 of the same size are also aligned adjacent to apertures 46 while all remaining, unselected, apertures 42 of hopper 10 are blocked by the structure of the selector 44.

After selector 44 is positioned to expose only the apertures 42 of the dispensing area to the contents of the hopper, the planting device may be used by orienting the planter assembly over the furrow into which the seeds are to be dispensed and by actuating the rotary delivery member by pressing down on handle 30 to rotate the rotary delivery member 16 about shaft 18 by means of rack 22 and pinion gear 20 mounted on shaft 18. A stop 48 may be fitted on rotary delivery member 16 to engage the side of hopper 44 when spring 36 returns shaft 26 and handle 32 to the initial position after the handle has been depressed and the rotary delivery member 16 has been rotated to deposit the seeds dispensed through apertures 42 into the seed-receiving furrow. In addition to providing a means for stopping rotary member 16 in the proper position for communication of seeds through apertures 42 into seed-receiving chambers 40, the stop 48 also provides a desirable agitation action to the seeds within hopper 10 when the return spring 36 returns the rotary delivery member rapidly to the initial position and stop 48 strikes the side of hopper 10.

Figure 7:
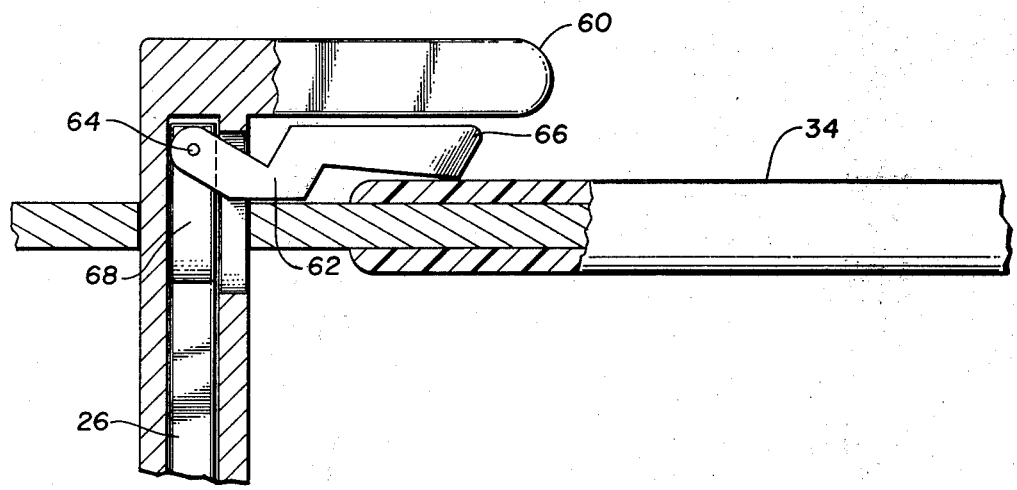

FIGS. 6 and 7 show in partially cut away form an alternative structure which may be used in place of knob 30 to accentuate the desirable seed agitation caused by projection 48 striking hopper 10. This structure comprises a handle 60 which includes a latch 62 which is enclosed in handle 60 for pivotal movement about a pivot point 64. A projection 66 of latch 62 extends outwardly from handle 60. The body of latch 62 when rod 26 is in the full upright initial position shown in FIG. 6 forms a barrier to movement of rod 26 and prevents it from moving upwardly further into channel 68 of handle 60. When handle 60 is depressed to operate the rack 22 and pinion 20 to dispense seeds, the body of latch 62 presses downwardly on rod 26 to move pinion 22. As the rod continues to move downwardly the extension 66 of latch 62 comes into contact with handle 34 as shown in FIG. 7 and begins to rotate latch 62 in a counterclockwise direction above its pivot point 64 moving the body of the latch out of channel 68 to permit the return spring 36 to drive rod 26 upwardly to the end of channel 68. As rod 26 moves rapidly upward, the rotary delivery member 16 is rapidly returned to its initial position and the projecting portion 48 of delivery member 16 strikes hopper 10 with considerable force agitating the seeds contained therein. After rod 26 strikes the top of channel 68 it begins to return handle 60 to the full upright initial position. The operator then fully returns the handle to the initial position, latch 62 drops into the initial position shown in FIG. 6 blocking the top of channel 68 and the actuation cycle may be repeated.

Other modifications and alterations may be made to the mechanism shown herein without departing from the spirit or scope of my invention which is described in the Claims set forth herein.

What is claimed is:

1. A seed planter for depositing selected quantities of seed in a spaced relationship on a seed bed, said seed planter comprising in combination:
    a seed hopper for receiving a supply of seeds having generally similar size and shape characteristics and directing said seeds to a seed dispensing area thereof containing a multiple set of collinear seed dispensing apertures of varying size;
    selector means for selectively exposing only selected seed dispensing apertures in each set of apertures;
    a rotary delivery member mounted below the seed dispensing area of said seed hopper, the surface of said member being interrupted by a collinear set of seed receiving chambers of varying size spaced for communication with corresponding apertures in the seed dispensing area of said seed hopper when said rotary delivery member is in a first position; and
    actuator means for moving said rotary delivery member from a first position wherein multiple charges of seeds are communicated to the seed receiving chambers of said member to a second position wherein said seeds are dispensed from the said chambers of said member onto said seed bed.

2. A seed planter as claimed in claim 1 wherein said seed hopper is a generally V-shaped through with seed dispensing apertures being distributed along the surface adjacent the apex of the "V" and wherein said selector means is also a generally V-shaped trough which is slidably inserted in said seed hopper, the surface of said selector means adjacent to the apex of the "V" is interrupted with one selector aperture for each set of seed dispensing apertures in said seed hopper, the area of said selector aperture being equal or greater than that of the largest aperture in said seed hopper.

3. A seed planter as claimed in claim 1 wherein said actuator means comprise:
    a rotary gear coaxially attached to one end of said rotary delivery member; and
    a linear gear segment slidably mounted to engage and rotate said rotary gear and said rotary delivery member from said first position to said second position when said segment is moved in a first direction to dispense seeds.

4. A seed planter as claimed in claim 3 wherein spring means connected to said seed hopper and said linear gear segment provide a restoring force moving said linear gear segment in a second direction after seeds are dispensed.

5. A seed planter as claimed in claim 4 wherein said actuator means comprises:
    a handle with a channel therein for receiving one end of said gear segment; and
    latch means pivotally mounted on said handle, said latch means in a first position blocking an upper portion of said channel and in a second position permitting said gear means to move into said upper portion of said channel, said latch means including a projecting means for engaging a portion of said seed planter and rotating said latch means from said first to said second position when said actuator means reaches said second position thereby permitting said spring means to move said gear segment into said upper portion of said channel in said handle thereby providing a rapid commencement of the return of said rotary delivery means to said first position.

* * * * *